(12) United States Patent
Takatori et al.

(10) Patent No.: US 6,519,521 B2
(45) Date of Patent: Feb. 11, 2003

(54) SHIFT CONTROL SYSTEM FOR AUTOMATIC TRANSMISSION

(75) Inventors: Kazuhiro Takatori, Fuji (JP); Osamu Sato, Fuji (JP); Yasushi Fujita, Fuji (JP); Tatsuya Imamura, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 10/040,274

(22) Filed: Jan. 4, 2002

(65) Prior Publication Data

US 2002/0116110 A1 Aug. 22, 2002

(30) Foreign Application Priority Data

Jan. 11, 2001 (JP) ........................................ 2001-003455

(51) Int. Cl.$^7$ .............................................. G06F 17/02
(52) U.S. Cl. ........................... 701/55; 180/337; 180/338
(58) Field of Search .............................. 701/55, 36, 83; 180/337, 338

(56) References Cited

U.S. PATENT DOCUMENTS

| | | | | |
|---|---|---|---|---|
| 4,106,369 A | * | 8/1978 | Taga ........................... | 475/127 |
| 5,443,427 A | * | 8/1995 | Ataka et al. ................. | 475/123 |
| 5,822,309 A | * | 10/1998 | Ayanoglu et al. ............ | 370/315 |
| 6,094,976 A | * | 8/2000 | Hayashi et al. ............. | 73/118.1 |
| 6,183,394 B1 | * | 2/2001 | Minowa et al. ............. | 477/102 |
| 6,254,512 B1 | * | 7/2001 | Minowa et al. ............. | 477/110 |
| 6,276,197 B1 | * | 8/2001 | Hayashi et al. ............. | 73/118.1 |

* cited by examiner

Primary Examiner—William A. Cuchlinski, Jr.
Assistant Examiner—Olga Hernandez
(74) Attorney, Agent, or Firm—Rossi & Associates (57) ABSTRACT

In an automatic transmission performing change-over of a first engaging element and a second engaging element between two gear positions, for example between the fourth gear and the fifth gear, an oil pressure command value A to one of these two engaging elements is retained as a current value "a" and an oil pressure command value B to the other of these two engaging elements is retained as a current value "b" and at the same time the calculation of a calculation value of a downshift form the fifth gear is started when a target gear position changes to the fourth gear or lower during upshift between the two gear positions. When downshift calculation values Ad, Bd reach the retained values "a", "b", the oil pressure command values A, B are switched to the downshift calculation values. Thereby, a timing for performing the change-over of respective engaging elements is properly achieved, and a downshift to the fourth gear can be promptly performed before the upshift is not finished, and shift shock and engine racing can be prevented.

6 Claims, 7 Drawing Sheets

| Gear Position | C1 | C2 | B1 | B2 | B3 |
|---|---|---|---|---|---|
| 1st |  | ○ | ○ |  |  |
| 2nd |  | ○ |  | ○ |  |
| 3rd |  | ○ |  |  | ○ |
| 4th | ○ | ○ |  |  |  |
| 5th | ○ |  |  |  | ○ |
| Rev |  |  | ○ |  | ○ |

SHIFT CONTROL SYSTEM FOR AUTOMATIC TRANSMISSION

BACKGROUND OF THE INVENTION

1. Field of the Invention

The present invention relates to a shift control system of an automatic transmission for a vehicle.

2. Description of the Prior Art

An automatic transmission for a vehicle achieves a plurality of gear positions respectively providing predetermined gear ratios by the combination of a planetary gear mechanism and a plurality of engaging elements such as clutch, brake or the like, which are actuated by hydraulic pressure, and the combination of engagement and release of the engaging elements.

Figure 5A:
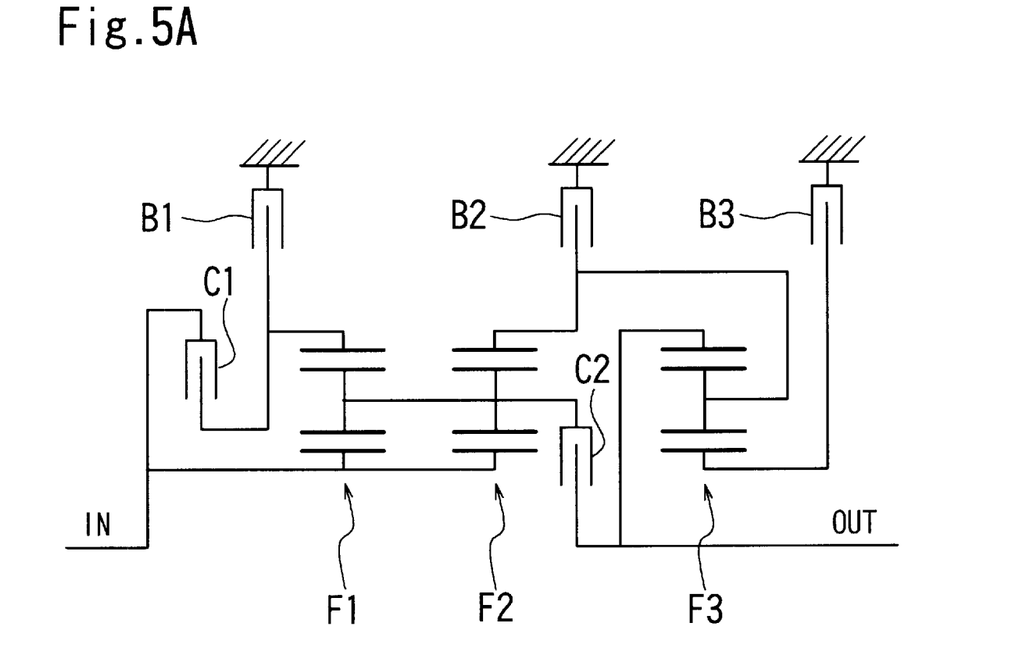
FIG. 5A is a schematic diagram showing a power transmission mechanism of an automatic transmission.
Figure 5B:
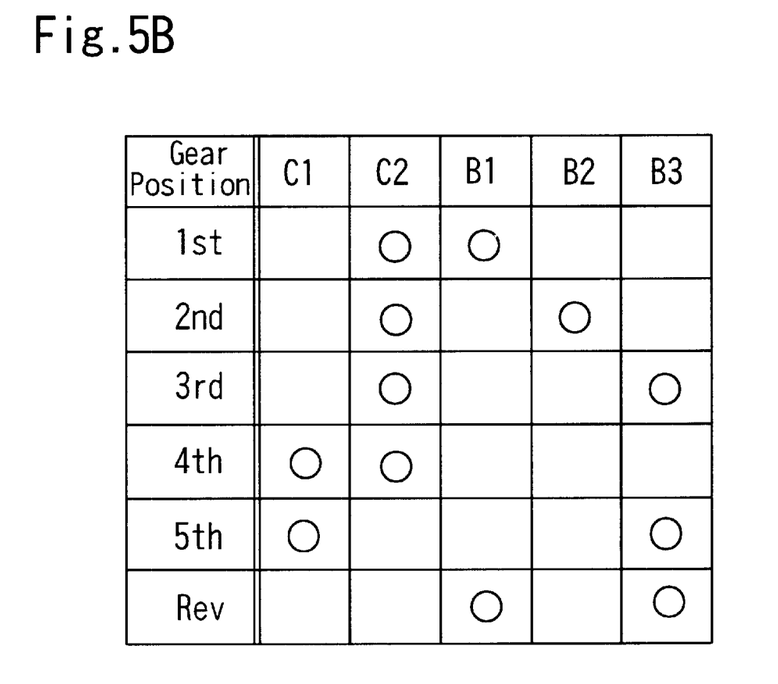
FIG. 5B is a view showing operational combinations of engagement elements for changing gears.

For example, in the automatic transmission disclosed in Japanese Patent Laid-open No. 8-200456, clutches C1, C2 and brakes B1, B2, B3 are disposed as engaging-elements in relation to three sets of planetary gear mechanisms F1, F2, F3, as shown in FIG. 5a, and gear positions of five forward speeds are obtained by the combination of engagement and release of these clutches and brakes, as shown in FIG. 5b. Here, circles indicate "engagement".

Figure 6A:
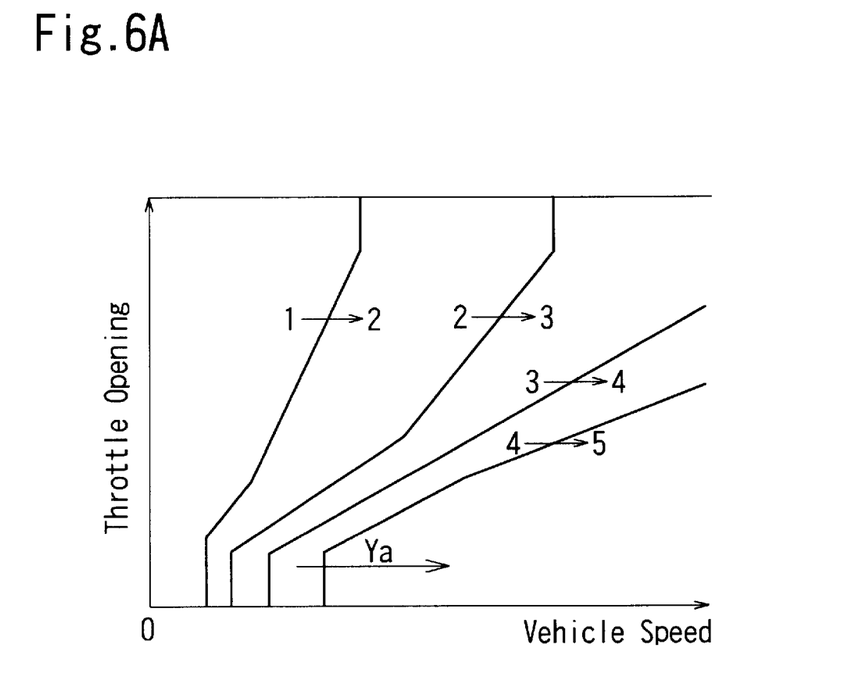
FIGS. 6A and 6B are diagrams showing shift lines of the automatic transmission.

As shown in the shift map of FIG. 6a, such an automatic transmission sets one of the aforementioned plurality of gear positions as a target gear position according to a throttle opening and a vehicle speed which are based on the driver's depression of an accelerator pedal and achieves this target gear position by setting a hydraulic pressure command value so that a predetermined engagement element is engaged or released and by controlling hydraulic pressure to be applied to each engagement element. FIG. 6a shows upshift lines only.

Here, if the vehicle speed increases in the state where the depression of the accelerator pedal is kept nearly constant during running in the fourth gear and crosses the 4–5 upshift line, as indicated by the arrow Ya in FIG. 6a, for example, the target gear position is changed to the fifth gear and a 4–5 upshift is executed.

In this 4–5 upshift, the clutch C2 engaged in the fourth gear is released and the brake B3 released in the fourth gear is engaged, that is, a so-called change-over is performed. At this time, in order to prevent engagement shock of a rotating member on the engagement side and overspeed of a rotating member on the release side, a timing control to gradually reduce and increase oil pressure command values to the clutch C2 and the brake B3 is performed by respectively spending a predetermined time.

Figure 6B:
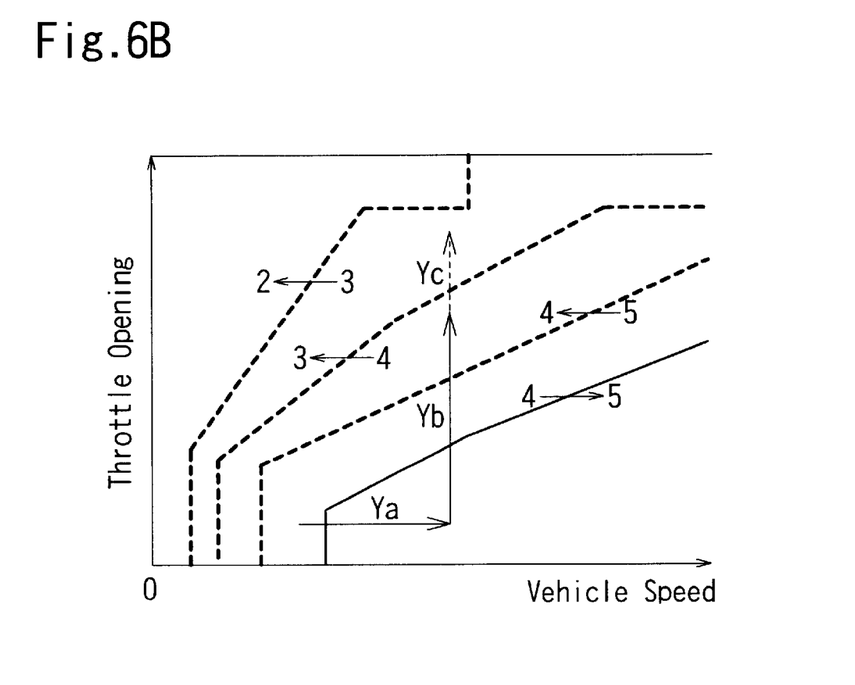

When the accelerator pedal is depressed during the aforementioned 4–5 upshift and the 5–4 downshift line is passed, as indicated by the arrow Yb in FIG. 6b, on the other hand, a target gear position is downed from the 5th gear to the 4th gear.

Figure 7A:
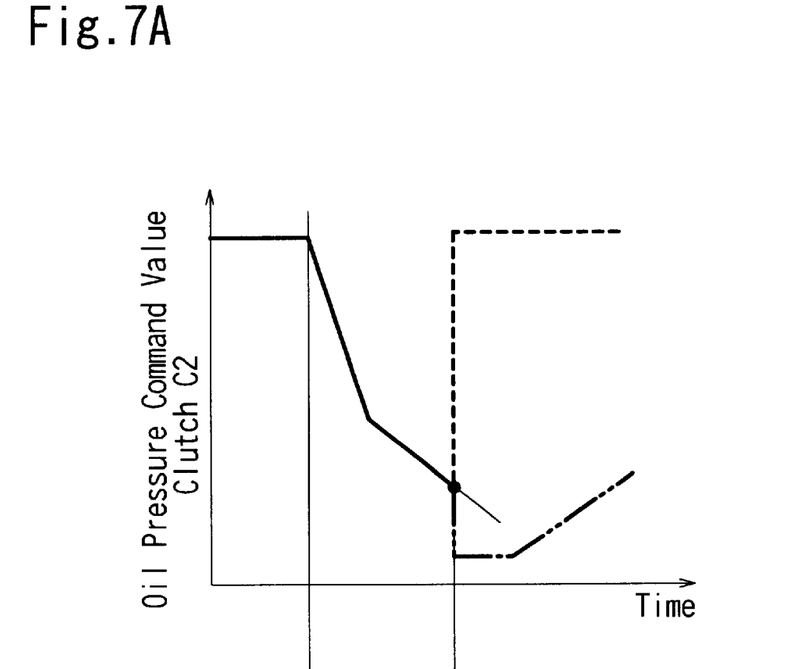
FIGS. 7A and 7B are explanatory diagrams showing problems with the conventional automatic transmission.
Figure 7B:
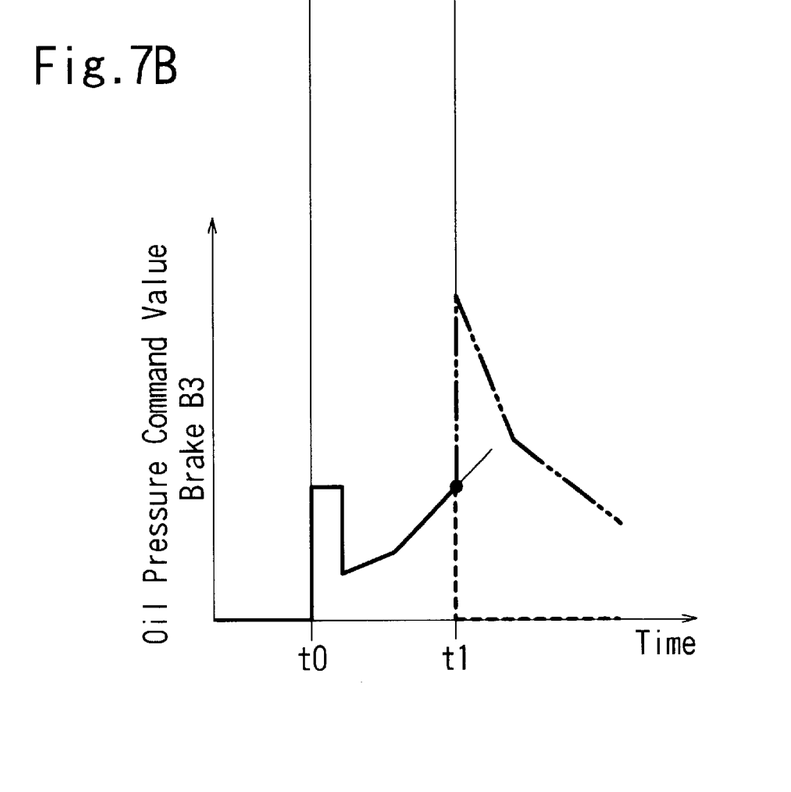

In this case, while the 4–5 upshift is performed according to an oil pressure command value indicated by the solid line in FIG. 7, if an oil pressure command to immediately release an increasing oil pressure and an oil pressure command to immediately restore a reducing oil pressure to an initial level are given at a time t1 when the aforementioned target gear position changed, as indicated by a broken line, timing of these two oil pressures commands is shifted, which causes the occurrence of shock and engine racing.

Alternatively, even in case of immediately switching to an oil pressure command value of the ordinary 5–4 downshift according to the change of the aforementioned target gear position, as indicated by the imaginary line in FIG. 7, a large deviation occurs between the oil pressure command value of the ordinary 5–4 downshift and an immediately preceding oil pressure command value indicated by the solid line, thereby causing the same problem.

Such a problem also arises in case where the 5–4 and 4–3 downshift lines are crossed during the 4–5 upshift as indicated by the arrow Yc in FIG. 6 and a downshift such as sets a target gear position to the third gear is performed.

As a conventional countermeasure for prevention of shock in such a downshift-control during upshift, for example, a downshift to the fourth gear is started after the current upshift is continued to reach the fifth gear even if the downshift line is passed and a target gear position is changed.

However, this countermeasure has a problem in that shift time from the start of upshift to the finish of downshift elongates.

SUMMARY OF THE INVENTION

The present invention has been made in view of the aforementioned problem, and its object is to provide a shift control system in an automatic transmission for a vehicle which allows an immediate speed change while preventing the occurrence of shock or the like in case of performing a downshift control during an upshift.

According to the first aspect of the present invention, a shift control method for automatic transmission which has two adjacent gear positions between which a change-over of a first engaging element and a second engaging element is performed, comprises the steps of: retaining oil pressure command values to the first engaging element and the second engaging element as current values, respectively, when a target gear position changes in a downshift direction during an upshift between the two adjacent gear positions; calculating downshift calculation values for a downshift between the two adjacent gear positions, which are applied to the first engaging element and the second engaging element; and setting the downshift calculation values as oil pressure command values to the first engaging element and the second engaging element after the downshift-calculation values reach the current values retained, respectively.

Therefore, oil pressure command values are smoothly transferred, and a timing for the change-over of the first engaging element and the second engaging element is properly achieved, whereby shift shock and engine racing is prevented. Moreover, since the switching from the middle gear position of upshift to downshift is promptly made, shift time is also shortened.

When the target gear position is a lower gear position than an initial gear position at a start time of the upshift, a shift-down to the lower gear position is executed after a downshift control between the two adjacent gear positions is completed.

Since an initial shift operation changes to the next shift operation after the initial shift operation is surely performed, shift shock between a plurality of gear positions can be prevented.

According to the second aspect of the present invention, a shift control system for automatic transmission which includes a first engaging element and a second engaging element which are actuated based on oil pressure commands and has a plurality of gear positions including two adjacent gear positions between which a change-over of a first engaging element and a second engaging element is performed, comprises: target gear position determining means for determining a target gear position based on a driving condition; means for calculating upshift calculation values for an upshift between the two adjacent gear positions, which are applied to the first engaging element and the second engaging element; retaining means for retaining oil pressure command values as current values of the upshift calculation values when the target gear position changes in a downshift direction during an upshift in which the upshift calculation values are set as the oil pressure command values; means for calculating downshift calculation values for a downshift between the two adjacent gear positions, which are applied to the first engaging element and the second engaging element, when the target gear position changes to a gear position in a downshift direction; and oil pressure command value switching means for setting the downshift calculation values as oil pressure command values to the first engaging element and the second engaging element when the downshift calculation values reach the current values retained by the retaining means.

Therefore, oil pressure command values are smoothly transferred, and a timing for the change-over of the first engaging element and the second engaging element is properly achieved, whereby shift shock and engine racing is prevented. Moreover, since the switching from the middle gear position of upshift to downshift is promptly made, shift time is also shortened.

It is preferred that the shift control system further comprises shift completion detecting means for detecting completion of a shift operation based on an oil pressure command value switched by the oil pressure command value switching means, and when the target gear position is a lower gear position than an initial gear position at a start time of the upshift, a downshift to the lower gear position is executed after completion of the shift operation the initial gear position is detected by the shift completion detecting means.

Thereby, shift shock between a plurality of gear positions can be prevented.

It is preferred that the shift completion detecting means detects that a gear ratio of the automatic transmission is a gear ratio of the initial gear position and determines that the shift operation is completed.

A gear ratio is easily determined, for example, by a ratio between a vehicle speed and a turbine speed of a torque converter, and the completion of a shift operation can be easily and surely detected.

It is preferred that the shift completion detecting means detects that a gear ratio of the automatic transmission is a gear ratio of the initial gear position and determines that the shift operation is completed when a predetermined time has elapsed thereafter.

Therefore, shift shock can be all the more surely prevented.

The above and further objects and features of the invention will be more fully apparent from the following description when the same is considered with reference to the accompanying drawings.

DETAILED DESCRIPTION OF THE PREFERRED EMBODIMENT

Here will be described the embodiment of the invention with reference to the accompanying drawings.

Figure 1:
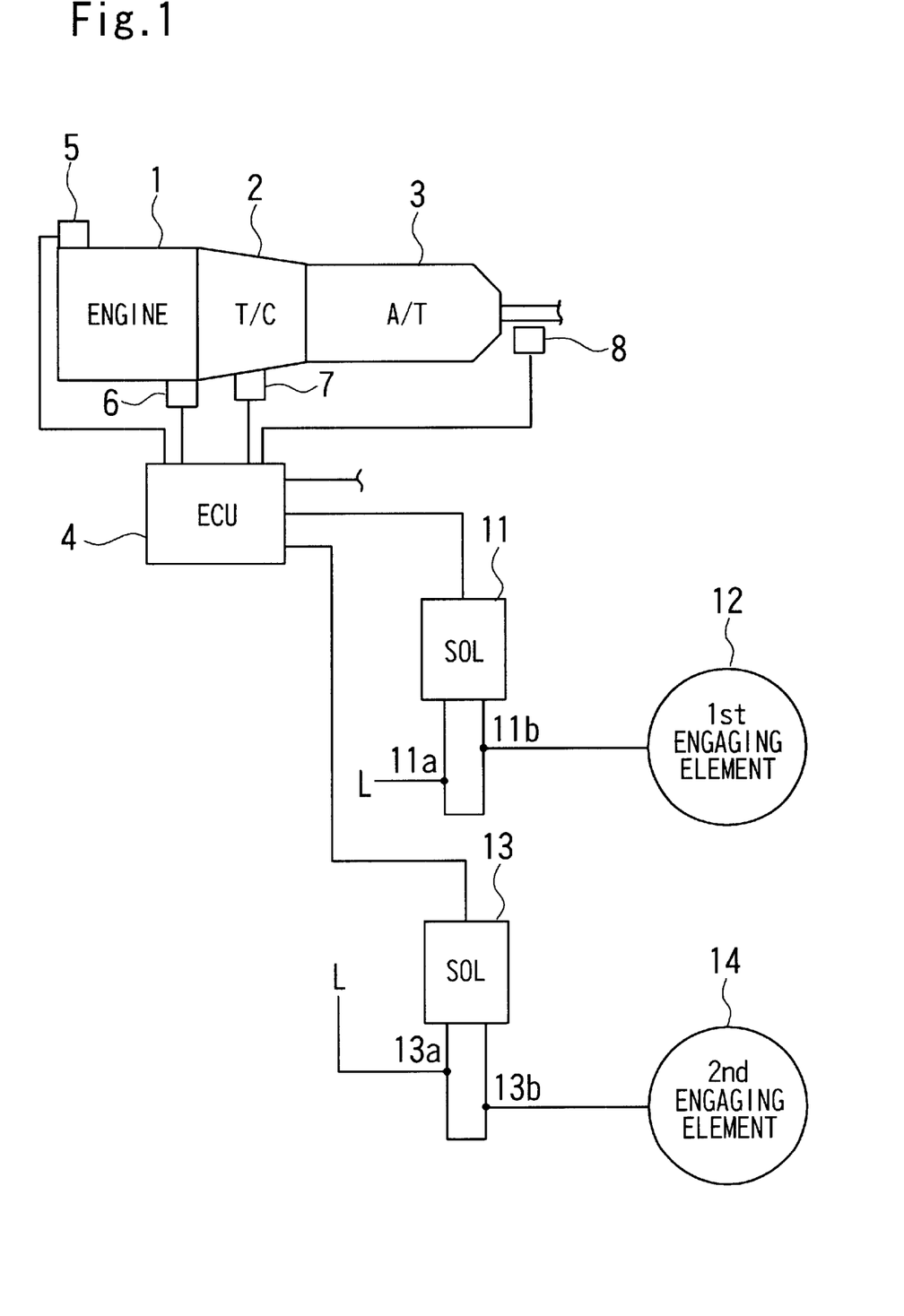
FIG. 1 is a circuit diagram showing oil pressure control according to an embodiment of the present invention.

FIG. 1 is a circuit diagram showing an oil pressure control in which the present invention is applied to a first engaging element and a second engaging element which are changed over between the fourth gear and the fifth gear, as in the automatic transmission of FIGS. 5A and 5B. The first engaging element 12 and the second engaging element 14 correspond to a clutch C2 and a brake B3 of the automatic transmission shown in FIGS. 5A and 5B, respectively.

An automatic transmission (A/T) 3 is connected through a torque converter 2 to an engine 1. An electronic control unit (ECU) 4 receives signals from a throttle sensor 5 detecting an opening degree TVO of a throttle valve of the engine 1, an engine speed sensor 6, a turbine speed sensor 7 detecting a turbine speed of the torque converter 2, and a vehicle speed sensor 8.

The vehicle speed sensor 8 detects an output speed of the automatic transmission 3. By multiplying this output speed by a predetermined coefficient, a vehicle speed VSP is obtained. The turbine speed corresponds to an input speed of the automatic transmission 3.

The electronic control unit 4 receives a signal from each sensor, as described above, to determine a gear position corresponding to a driving condition and also controls oil pressure depending on load applied to each engaging element.

More specifically, the electronic control unit 4 outputs control signals to solenoid valves (SOL) 11 and 13 which are disposed in relation to a first engaging element 12 and a second engaging element 14, respectively. On the basis of the control signals from the electronic control unit 4, the solenoid valves 11 and 13 regulate line pressures L which are inputted to input ports 11a and 13a and output the regulated line pressures L to the first engaging element 12 and the second engaging element 14 from output ports 11b and 13b, respectively.

The electronic control unit 4 outputs control signals to other not-shown engaging elements in the same way.

In the fourth gear position, the first engaging element 12 is engaged and the second engaging element 14 is released. In the fifth gear position, the first engaging element 12 is released and the second engaging element 14 is engaged.

The electronic control unit 4 generates oil pressure command values on its inside and outputs current equivalent to the oil pressure command values as the aforementioned control signals.

Figure 2:
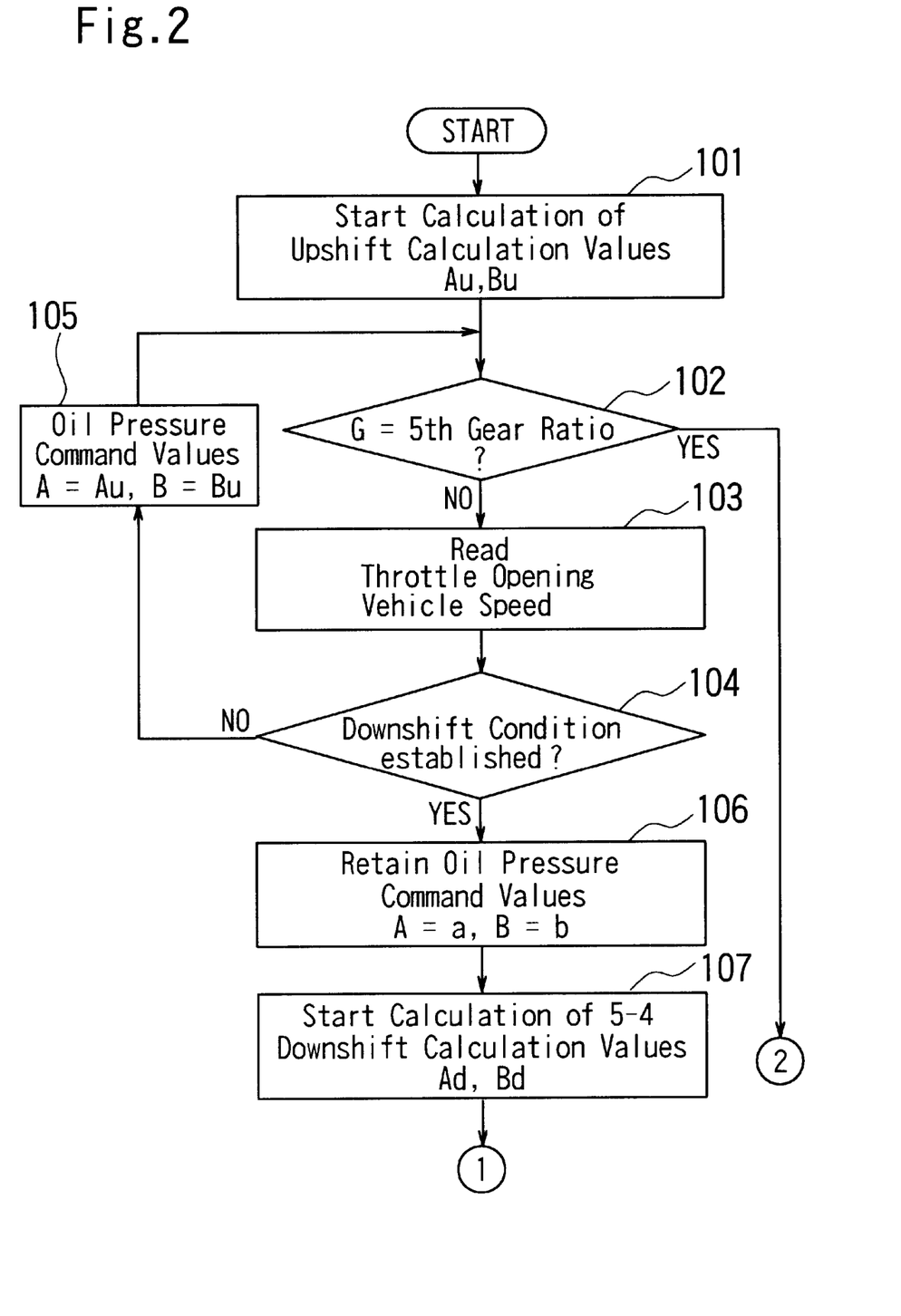
FIGS. 2 and 3 are flow charts showing a control flow of oil pressure command values.
Figure 3:
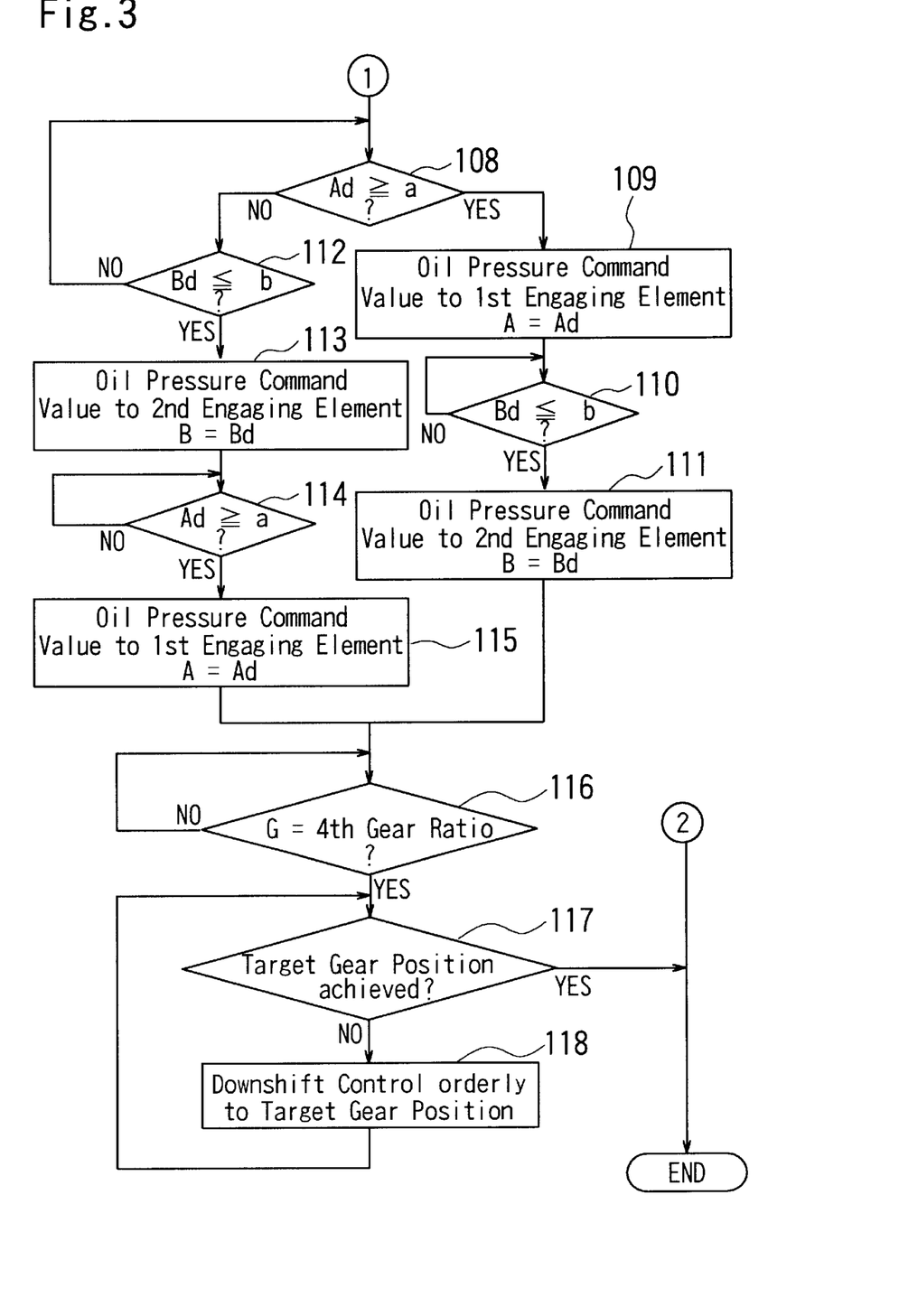

FIGS. 2 and 3 are flow charts showing the control flow of oil pressure command value in the electronic control unit 4 in the case where a target gear position changes in the downshift direction when for instance a not-shown accelerator pedal is depressed during the 4–5 upshift. Moreover, FIG. 4 is a diagram showing changes of oil pressure command values.

This control flow is started at the time of the start of the 4–5 upshift.

Figure 4A:
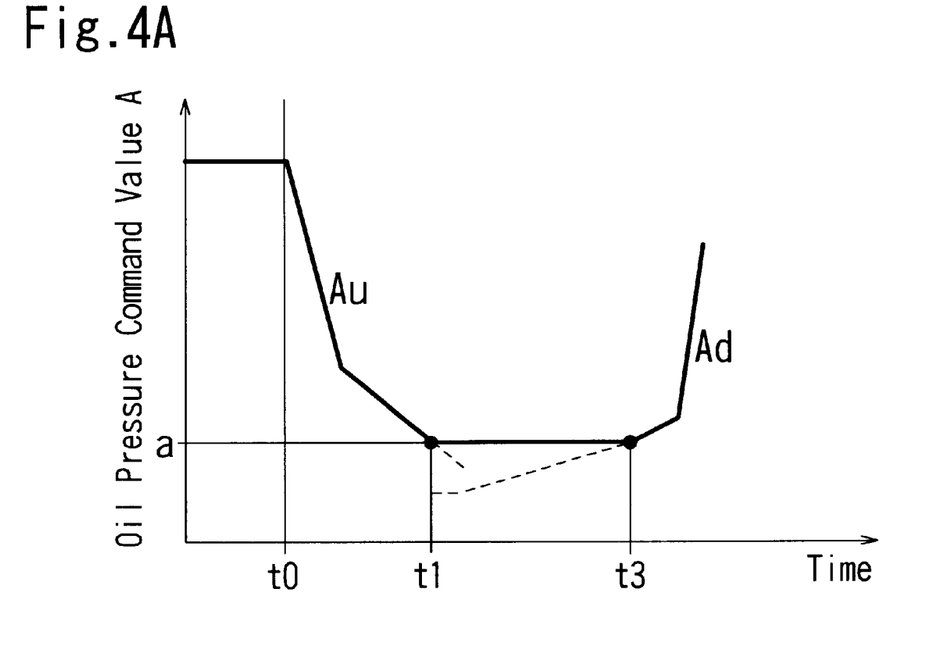
FIGS. 4A and 4B are diagrams showing changes of oil pressure command values.
Figure 4B:
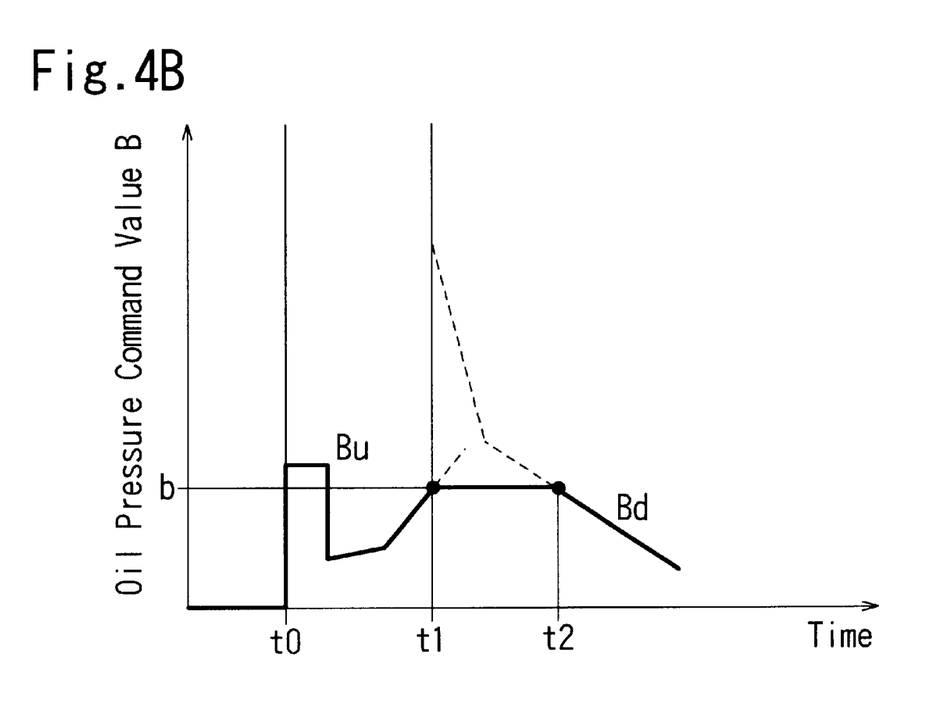

In an upshift control, first in a Step 101, the calculation of oil pressure command values for upshift which are applied to the first engaging element 12 and the second engaging element 14 is started at a time t0 shown in FIG. 4. This calculation result obtained in the Step 101 is set as upshift calculation values Au and Bu.

In a Step 102, it is checked whether a gear ratio G is a gear ratio of the fifth gear. The gear ratio G is determined by a ratio between an output speed and an input speed of the automatic transmission 3, that is, a ratio between a vehicle speed and a turbine speed.

In a Step 103, the electronic control unit 4 reads signals from the throttle sensor 5 and the vehicle speed sensor 8. In a Step 104, it is checked whether a downshift condition is established, that is, whether the 5–4 downshift line is crossed, for example by referring to the shift line maps of FIGS. 6a and 6b.

While the downshift condition is not established, in a Step 105, the upshift calculation values Au and Bu are set as oil pressure command values A and B, on the basis of which the electronic control unit 4 outputs control signals to the first engaging element 12 and the second engaging element 14. Then, the routine returns to the Step 102.

If the gear ratio G reaches a gear ratio of the fifth gear while the Steps 102 to 105 are repeated, the finish of the 4–5 upshift is judged, and the upshift control is finished.

If the downshift condition is established at the time ti, the routine advances from the Step 104 to a Step 106. In the Step 106, the oil pressure command values A and B to the first and second engaging elements 12 and 14 are fixed to and retained as current values "a" and "b" of the upshift calculation values Au and Bu. Thereby control signals are also retained.

In a Step 107, calculation of oil pressure command values to the first engaging element 12 and the second engaging elements 14 in an ordinary 5–4 downshift is started at the same time as the start of the aforementioned retention of the oil pressure command values. The calculation is continued in conjunction with this control flow, and the calculation results are set as downshift calculation values Ad and Bd.

Incidentally, the downshift condition is established not only when a target gear position is set to the fourth gear, but also when a target gear position is set to the third gear according to change of driving conditions. In either case, first the calculation of oil pressure command values in the 5–4 downshift is started.

In a Step 108, a retention value "a" of an oil pressure command value to the first engaging element 12 is compared with an increasing downshift calculation value Ad.

When the downshift calculation value Ad is lower than the retention value "a", then in a Step 112, a retention value "b" of an oil pressure command value to the second engaging element 14 is compared with a reducing downshift calculation value Bd.

When the downshift calculation value Bd is higher than the retention value "b", the routine returns to the Step 108.

Before the downshift calculation value Bd becomes lower than the retention value "b", if the downshift calculation value Ad exceeds the retention value "a" at the time of check in the Step 108, the routine advances to a Step 109. Then, the retention is released, and the oil pressure command value A to the first engaging element 12 is switched to the downshift calculation value Ad.

After that, in a Step 110, the retention value "b" of an oil pressure command value to the second engaging element 14 is compared with the reducing downshift calculation value Bd, and this Step is repeated until the downshift calculation value Bd becomes lower than the retention value "b".

When the downshift calculation value Bd becomes lower than the retention value "b", the retention is released in a Step 111, and the oil pressure command value B to the second engaging element 14 is switched to the downshift calculation value Bd.

On the other hand, before the downshift calculation value Ad exceeds the retention value "a", if the downshift calculation value Bd becomes lower than the retention value "b" at the time of check in the Step 112, the routine advances to a Step 113. Then, the retention is released, and the oil pressure command value B to the second engaging element 14 is switched to the downshift calculation value Bd.

After that, in a Step 114, the retention value "a" of an oil pressure command value to the first engaging element 12 is compared with the increasing downshift calculation value Ad, and this Step is repeated until the downshift calculation value Ad exceeds the retention value "a".

When the downshift calculation value Ad exceeds the retention value "a", the retention is released in a Step 115, and the oil pressure command value A to the first engaging element 12 is switched to the downshift calculation value Ad.

After the Step 111 and the Step 115, it is checked, in a Step 116, whether the gear ratio G reaches a gear ratio of the fourth gear.

If the gear ratio G reaches a gear ratio of the fourth gear, it is judged that the shift operation of the 5–4 downshift is completed.

If the completion of the 5–4 downshift is judged by repetition of the check in the Step 116, it is also checked on the basis of a gear ratio whether a target gear position at the time of establishment of the downshift condition is achieved in a Steps 117.

When the target gear position is not achieved, the routine advances to a Step 118, and a downshift control is performed for each gear position until a target gear position is obtained.

For example, if the operation is shifted only to the fourth gear, in case a target gear position at the time of establishment of the downshift condition is the third gear, a target gear position is not achieved. Therefore, in the Step 118, a downshift control to the third gear from the fourth gear is performed.

Then, the routine returns to the Step 117.

In the Step 117, if it is checked that a gear ratio reaches a gear ratio of a target gear position and it is judged that the target gear position is achieved, this control is finished.

In this way, an oil pressure command value is switched to a downshift calculation value after a downshift calculation value reaches a retention value with respect to one of the first engaging element 12 and the second engaging element 14. Then, after a downshift calculation value reaches a retention value with respect to the other of these two engaging elements 12 and 14, an oil pressure command value is switched to a downshift calculation value.

In the examples shown in FIG. 4, after the retention value "b" of an oil pressure command value to the second engaging element 14 is switched to the downshift calculation value Bd at a time t2, the retention value "a" of an oil pressure command value to the first engaging element 12 is switched to the downshift calculation value Ad at a time t3. In short, the routine proceeds from the Step 108 to the Step 112 and from the Step 113 to the Step 115 in order.

For example, in case the accelerator pedal is deeply depressed during the 4–5 upshift and a target gear position changes to the third gear, an oil pressure command value is first retained as a current value and then switched to a downshift calculation value for the 5–4 downshift and the downshift to the fourth gear is terminated once. Then, the ordinary downshift to the third gear from the fourth gear is performed.

In this embodiment, the Step 101 corresponds to means for calculating upshift calculation values, the Steps 103 and 104 correspond to target gear position determining means, the Step 107 corresponds to means for calculating downshift calculation values, and the Step 106 corresponds to retaining means.

Moreover, the Steps 108 to 115 correspond to oil pressure command value switching means, and the Step 116 corresponds to speed change completion detecting means.

As stated above, in the automatic transmission performing an upshift operation by changing over the first engaging element 12 and the second engaging element 14, when a target gear position changes toward the downshift direction during the 4–5 upshift, for example, an oil pressure command value is retained as a current value, and at the same time the calculation of a downshift calculation value from a gear position (the fifth gear), to which the transmission is shifted up, is started. After downshift calculation values which are applied to the first engaging element 12 and the second engaging element 14 reach retention values respectively, the downshift calculation values are set as oil pressure command values. Therefore, timing for changing over the first engaging element 12 and the second engaging element 14 can be properly ensured. Thereby, simultaneously with prevention of shift shock and engine racing, a prompt switching to downshift during upshift can be made.

Moreover, when a downshift target gear position during upshift is a lower gear position (e.g. the third gear) than an initial gear position (the fourth gear) at the time of starting upshift, a downshift to the lower gear position is executed after a control to return to the initial gear position once is completed in a downshift control by a downshift calculation value via the retention value. Therefore, each downshift operation to a target gear position is surely performed, and shift shock does not occur also between respective downshift operations.

Here, since the completion of each shift control is judged on the basis of the fact that a gear ratio is a gear ratio of each gear position, a completion state can be easily and surely detected.

In the above flow chart, when a downshift control for next one gear position is performed in the Step 118, the completion of an immediately preceding downshift operation is determined on the basis of gear ratio by using a timer, for example in the Step 116. Then, if the downshift control is started after a predetermined time, e.g. 0.2 to 0.3 sec, passed, shift shock can be all the more surely prevented.

Further, in this embodiment, it is described as to the case where engaging elements are changed over between the fourth gear and the fifth gear. However, the present invention is not limited to this but is applied to a downshift control performed during upshift in an automatic transmission in which engaging elements are changed over between two gear positions without specifying gear positions.

What is claimed is:

1. A shift control method for automatic transmission which has two adjacent gear positions between which a change-over of a first engaging element and a second engaging element is performed, comprising the steps of:
    retaining oil pressure command values to the first engaging element and the second engaging element as current values, respectively, when a target gear position changes in a downshift direction during an upshift between the two adjacent gear positions;
    calculating downshift calculation values for a downshift between the two adjacent gear positions, which are applied to the first engaging element and the second engaging element; and
    setting the downshift calculation values as oil pressure command values to the first engaging element and the second engaging element after the downshift calculation values reach the current values retained, respectively.

2. A shift control method for an automatic transmission as claimed in claim 1, wherein when the target gear position is a lower gear position than an initial gear position at a start time of the upshift, a downshift to the lower gear position is executed after a downshift control between the two adjacent gear positions is completed.

3. A shift control system for automatic transmission which includes a first engaging element and a second engaging element which are actuated based on oil pressure commands and has a plurality of gear positions including two adjacent gear positions between which a change-over of the first engaging element and the second engaging element are performed, comprising:
    target gear position determining means for determining a target gear position based on a driving condition;
    means for calculating upshift calculation values for an upshift between the two adjacent gear positions, which are applied to the first engaging element and the second engaging element;
    retaining means for retaining oil pressure command values as current values of the upshift calculation values when the target gear position changes in a downshift direction during an upshift in which the upshift calculation values are set as the oil pressure command values;
    means for calculating downshift calculation values for a downshift between the two adjacent gear positions, which are applied to the first engaging element and the second engaging element, when the target gear position changes to a gear position in a downshift direction; and
    oil pressure command value switching means for setting the downshift calculation values as oil pressure command values to the first engaging element and the second engaging element when the downshift calculation values reach the current values retained by the retaining means.

4. A shift control system for an automatic transmission as claimed in claim 3, further comprising:
    shift completion detecting means for detecting completion of a shift operation based on an oil pressure command value switched by the oil pressure command value switching means;
    wherein when the target gear position is a lower gear position than an initial gear position at a start time of the upshift, a downshift to the lower gear position is executed after completion of said shift operation is detected by the shift completion detecting means.

5. A shift control system for an automatic transmission as claimed in claim 4, wherein the shift completion detecting means determines that the shift operation is completed when the detected gear ratio of the automatic transmission has reached a gear ratio of the initial gear position.

6. A shift control system for an automatic transmission as claimed in claim 4, wherein the shift completion detecting means determines that the shift operation is completed when the detected gear ratio of the automatic transmission has reached a gear ratio of the initial gear position and a predetermined time has elapsed thereafter.

* * * * *